United States Patent
Semyonov

(10) Patent No.: US 11,920,069 B2
(45) Date of Patent: Mar. 5, 2024

(54) COMPOSITIONS CONTAINING SEMICONDUCTING NANOPARTICLES, AND POLYMER OR COMPOSITE LAYERS FORMED THEREFROM, AND OPTICAL DEVICES

(71) Applicant: MERCK PATENT GMBH, Darmstadt (DE)

(72) Inventor: Artyom Semyonov, Rehovot (IL)

(73) Assignee: MERCK PATENT GMBH, Darmstadt (DE)

( * ) Notice: Subject to any disclaimer, the term of this patent is extended or adjusted under 35 U.S.C. 154(b) by 110 days.

(21) Appl. No.: 17/438,238

(22) PCT Filed: Mar. 10, 2020

(86) PCT No.: PCT/EP2020/056282
§ 371 (c)(1),
(2) Date: Sep. 10, 2021

(87) PCT Pub. No.: WO2020/182778
PCT Pub. Date: Sep. 17, 2020

(65) Prior Publication Data
US 2022/0186113 A1    Jun. 16, 2022

(30) Foreign Application Priority Data
Mar. 12, 2019    (EP) .................................... 19162358

(51) Int. Cl.
C09K 11/02    (2006.01)
C09K 11/70    (2006.01)
C09K 11/88    (2006.01)

(52) U.S. Cl.
CPC ............ C09K 11/025 (2013.01); C09K 11/70 (2013.01); C09K 11/883 (2013.01)

(58) Field of Classification Search
CPC ..... C09K 11/025; C09K 11/70; C09K 11/883; C09K 11/62
See application file for complete search history.

(56) References Cited

U.S. PATENT DOCUMENTS

| | | | |
|---|---|---|---|
| 8,471,969 | B2 | 6/2013 | Banin et al. |
| 2018/0044586 | A1* | 2/2018 | Kwon ..................... H01L 33/34 |
| 2018/0072949 | A1 | 3/2018 | Satake et al. |
| 2018/0074401 | A1 | 3/2018 | Nam et al. |
| 2020/0369954 | A1 | 11/2020 | Qiu et al. |

FOREIGN PATENT DOCUMENTS

| | | | |
|---|---|---|---|
| CN | 108445714 A | | 8/2018 |
| CN | 108445715 A | | 8/2018 |
| KR | 2016-0043860 | * | 4/2016 |
| TW | 201840599 A | | 11/2018 |
| WO | 10095140 A2 | | 8/2010 |
| WO | WO 2017/165726 | * | 9/2017 |
| WO | 18180445 A1 | | 10/2018 |
| WO | 19030680 A1 | | 2/2019 |
| WO | WO 2019/083112 | * | 5/2019 |

OTHER PUBLICATIONS

Cunningham et al. "Assessment of Anisotropic Semiconductor Nanorod and Nanoplatelet Heterostructures with Polarized Emission for Liquid Crystal Display Technology" ACS Nano_2016_ 10 (6)_ pp. 5769-5781.
International Search Report PCT/EP2020/056282 dated dated May 7, 2020 (pp. 1-4).

* cited by examiner

*Primary Examiner* — C Melissa Koslow
(74) *Attorney, Agent, or Firm* — MILLEN, WHITE, ZELANO & BRANIGAN, P.C.; Csaba Henter

(57) ABSTRACT

Compositions containing at least one sort of semiconducting nanoparticle, at least one antioxidant, a polymerizable component, a liquid organic compound and an organic additive of formula (II)

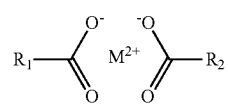

(II)

wherein M is a divalent metal ion; and $R_1$ and $R_2$ are, each independently, a straight chain alkyl group having 1 to 16 carbons atoms, or a straight chain alkenyl group having 2 to 15 carbon atoms or branched chain alkyl or alkenyl group having 3 to 15 carbon atoms, and polymer or composite layers formed therefrom, optical devices containing the layers and their preparation and method of use, as well as a method to improve at least one feature of a quantum material or a quantum material layer.

18 Claims, No Drawings

COMPOSITIONS CONTAINING SEMICONDUCTING NANOPARTICLES, AND POLYMER OR COMPOSITE LAYERS FORMED THEREFROM, AND OPTICAL DEVICES

The invention relates to a composition and a method of manufacturing such composition, wherein the composition comprises at least these components: i) at least one sort of semiconducting light emitting nanoparticle; and
  ii) at least one antioxidant;
  iii) a liquid organic compound.

Semiconducting light emitting nanoparticles, also referred to as quantum materials, such as quantum dots, quantum rods, tetrapods and the like are of great interest as color converter materials in LEDs and displays due to their narrow light emission. Using quantum material for applications such as down conversion layers in LCDs, color filters and color converters directly on top of LEDs requires the Semiconducting nanoparticles to be incorporated into a thin layer that would provide protection for the nanoparticles. A polymer film which contains a quantum material is one way to achieve these desired thin layers. Various polymers have been used for this purpose, such as acrylate, siloxanes, silazanes, epoxies, silicones, and so on. In particular, acrylates are abundantly used for backlight film applications.

Incorporation of a quantum material like quantum dots into this kind of layers causes a drop in their emission quantum Yield (QY). This is caused by aggregation of the quantum material in the solid polymer film and due to chemical processes, which affect the organic molecules attached to the surface of the quantum material (known as ligands) and cause detachment of the ligands from the quantum materials surface occurs. This can also occur during shelf life of the dispersions comprising quantum materials prior to a preparation of a layer therefrom. Moreover, the conditions under which the dispersion is polymerized to form a polymer layer comprising quantum dots itself can cause a drop in the emission quantum yield of the resulting layer.

Accordingly, and despite all efforts of the past it is still an object to provide dispersions of a semiconducting light emitting nanoparticle, such as a quantum material, with improved properties and/or versatility. In general terms, it is an object of the present invention to at least partly overcome at least one of the disadvantages that are known from the prior art.

Another object is to provide a composition comprising a semiconducting light emitting nanoparticle, such as a quantum material, for application on substrates which can be used to manufacture layers with said quantum material, wherein the quantum yield of the quantum material is preserved, enhanced or at least less reduced as is in those known in the art.

Another object of the invention is to provide a semiconducting light emitting nanoparticle, such as a quantum material, in a composition, wherein the semiconducting light emitting nanoparticle is more efficient and/or exhibit higher output than those known in the art.

Another object of the invention is to provide a semiconducting light emitting nanoparticle in a dispersion which can be stocked for extended periods.

Another object of the invention is to provide dispersions with semiconducting light emitting nanoparticle which do not, or little suffer during an application and fixation to form a layer on a substrate.

Another object is to provide dispersions with semiconducting light emitting nanoparticles which are protected against photooxidation.

A contribution to the solution of at least one of the above objects is provided by the subject-matter of the category-forming embodiments. The dependent sub-embodiments of the category-forming embodiments represent preferred embodiments of the invention, the subject-matter of which also contributes to solving at least one of the objects mentioned above.

Preferred Embodiments

|1|. A composition comprising, essentially consisting of, or consisting of, at least these components:
  i) at least one sort of semiconducting light emitting nanoparticle;
  ii) at least one antioxidant;
  iii) a polymerizable component; and
  iv) a liquid organic compound.

Preferably, the composition comprises in the range from 50 to 400 parts of the polymerizable component based on 100 parts of said semiconducting light emitting nanoparticles in the composition.

|2|. The composition of embodiment 1, wherein said antioxidant is selected from the group consisting of:
  A) a hydroxyphenolic compound comprising a hydroxyphenolic fragment and at least one hydroxy group, wherein the hydroxyphenolic fragment has at least one tert-alkyl group in alpha-position to the at least one hydroxy group, for example 2-tert-Butylhydrochinone; 4-tert-Butylcatechol; 6-tert-Butyl-2,4-xylenol; 3,5-Di-tert-butyl-4-hydroxytoluene; 2,6-Di-tert-butylphenol; or a combination of two or more thereof;
  A) a hydroxyphenolic compound which has two hydroxy groups, for example hydroquinone;
  B) 2,2-diphenyl-1-picrylhydrazyl;
  C) an alkoxy phenol;
  D) a heterocyclic thiazine;
  E) a polyphenol; and
  F) a hindered amine stabilizer, such as 2,2,6,6-tetramethyl piperidine, 1,2,2,6,6-pentamethyl piperidine;
  or a combination of two or more thereof, for example, a combination of two or more antioxidants of one of the groups A)-G), or a combination of two or more antioxidants selected from different groups A) through G).

Preferably, said antioxidant is a hydroxyphenolic compound comprising a hydroxyphenolic fragment and at least one hydroxy group, wherein the hydroxyphenolic fragment has at least one tert-alkyl group in alpha-position to the at least one hydroxy group, for example 2-tert-Butylhydrochinone; 4-tert-Butylcatechol; 6-tert-Butyl-2,4-xylenol; 3,5-Di-tert-butyl-4-hydroxytoluene; 2,6-Di-tert-butylphenol; or a combination of two or more thereof, even more preferably it is 3,5-di-tert-butyl-4-hydroxytoluene.

|3|. The composition of any one of the preceding embodiments, wherein the polymerizable component is selected from the group consisting of UV curable monomers and thermally curable monomers.

|4|. The composition according to any one of the preceding embodiments, wherein the composition comprises in the range from 20 to 1,000 parts of the at least one antioxidant based on 100 parts of the semiconducting light emitting nanoparticles in the composition.

|5|. The composition according to any one of the preceding embodiments, wherein the composition further comprises an organic additive, which is composed of a divalent metal ion and at least one functionalized hydrocarbon group.

|6|. The composition according to any one of the preceding embodiments, wherein the quantum material comprises In and P.

|7|. The composition according to any one of the preceding embodiments, wherein the liquid organic compound is selected from the group consisting of monoalkyl ethers, diethylene glycol dialkyl ethers, alkylene glycol ether acetates such as ethylene or propylene glycol alkyl ether acetates, aromatic hydrocarbons, ketones, alcohols esters, and ethylene carbonate, or a combination of two or more thereof.

|8|. The composition according to any one of the preceding embodiments, wherein the quantum yield of the composition after 16 hours from preparation is at least 90%, with respect to the composition at the time of preparation and under the conditions described herein.

|9|. A method of manufacturing the composition according to any one of embodiments |1| to |8|, comprising, essentially consisting of, or consisting of at least these steps:
 (i) Providing the quantum material;
 (ii) Providing the at least one antioxidant;
 (iii) Providing the liquid organic component;
 (iv) Providing the polymerizable component;
 (v) Mixing the components of steps (i)-(iv).

|10|. The method of embodiment |9|, wherein the composition is subjected to irradiation with light of a wavelength selected from a range of 300 to 600 nm having an intensity in the range from 0.025 to 1 W/cm$^2$.

|11|. A method of manufacturing a polymer layer comprising, essentially consisting of, or consisting of at least these steps:
 (a) Providing a substrate;
 (b) Providing the composition of any one of embodiments |1| to |8| or a composition obtainable by a method as of any one of embodiments |9| or |10|;
 (c) Applying the composition to the substrate to form a layer;
 (d) Polymerizing the composition.

|12|. A layered composite comprising, essentially consisting of, or consisting of at least:
 aa) a layer comprising at least
  (A) a semiconducting light emitting nanoparticle,
  (B) a matrix polymer and
  (C) at least one antioxidant,
 preferably the at least one oxidant is selected from the group consisting of:
  A) a hydroxyphenolic compound comprising a hydroxyphenolic fragment and at least one hydroxy group, wherein the hydroxyphenolic fragment has at least one tert-alkyl group in alpha-position to the at least one hydroxy group, for example 2-tert-Butylhydrochinone; 4-tert-Butylcatechol; 6-tert-Butyl-2,4-xylenol; 3,5-Di-tert-butyl-4-hydroxytoluene; 2,6-Di-tert-butylphenol; or a combination of two or more thereof;
  B) a hydroxyphenolic compound which has two hydroxy groups, for example hydroquinone;
  C) 2,2-diphenyl-1-picrylhydrazyl;
  D) an alkoxy phenol;
  E) a heterocyclic thiazine;
  F) a polyphenol; and
  a hindered amine stabilizer, such as 2,2,6,6-tetramethyl piperidine, 1,2,2,6,6-pentamethyl piperidine; or a combination of two or more thereof, for example, a combination of two or more antioxidants of one of the groups A)-G), or a combination of two or more antioxidants selected from different groups A) through G);
 bb) a substrate;
 cc) optionally one or more further layers.

|13|. An optical device comprising a layered composite according to embodiment |12| or a layered composite obtainable by a method according to embodiment |11|.

|14|. Use of an antioxidant selected from the group consisting of:
 A) a hydroxyphenolic compound comprising a hydroxyphenolic fragment and at least one hydroxy group, wherein the hydroxyphenolic fragment has at least one tert-alkyl group in alpha-position to the at least one hydroxy group, for example 2-tert-Butylhydrochinone; 4-tert-Butylcatechol; 6-tert-Butyl-2,4-xylenol; 3,5-Di-tert-butyl-4-hydroxytoluene; 2,6-Di-tert-butylphenol; or a combination of two or more thereof;
 B) a hydroxyphenolic compound which has two hydroxy groups, for example hydroquinone;
 C) 2,2-diphenyl-1-picrylhydrazyl;
 D) an alkoxy phenol;
 E) a heterocyclic thiazine;
 F) a polyphenol; and
 G) a hindered amine stabilizer, such as 2,2,6,6-tetramethyl piperidine, 1,2,2,6,6-pentamethyl piperidine;
 or a combination of two or more thereof, for example, a combination of two or more antioxidants of one of the groups A)-G), or a combination of two or more antioxidants selected from different groups A) through G); to improve at least one feature of a quantum material or a quantum material layer, wherein the feature is selected from the group consisting of:
 (I) the storage time of a dispersion comprising quantum material;
 (II) the quantum yield of a dispersion comprising quantum material;
 (III) the quantum yield of layers comprising quantum material;
 (IV) the thermal stability of layers comprising quantum material;
 (V) the photo-stability of layers comprising quantum material; or a combination of two or more thereof.

Definitions

The term "in the range from x to y" is understood in the present context to comprise all values between the number x and y, and also the limit forming numbers x and y. For example, the term "in the range from 2 to 13" comprises the numbers 2, 13 and all in between.

A liquid is a compound or a mixture of two or more compounds which is liquid at room temperature (20° C.). This means that a maximum of 1 wt.-% of such liquid does not pass a filter with pores having 1 µm.

A liquid organic compound is a compound that is composed of one or more carbon-carbon and/or carbon-hydrogen bonds. It may further comprise hetero atoms, for example one or more selected from the group consisting of N, O, P, S.

A "Polymer" is a material which is built by one or more repeat units. "Polymerizable component" describes a chemical compound which is able to form or to be incorporated in a polymer during a polymerization. Chemical compounds can be followed by an expression in brackets. In this event, the bracket mentions a trademark for illustrative purposes, under which the chemical compound can be purchased.

Parts relate to amounts of weight. For example, 100 parts of A and 6 parts of B and 12 parts of C mean, if providing 100 g of A, 6 g of B and 12 g of C.

DETAILED DESCRIPTION OF THE INVENTION

A first aspect of the invention is a composition comprising, essentially consisting of, or consisting of, at least these components:
i) at least one sort of semiconducting light emitting nanoparticle; and
ii) At least one antioxidant;
iii) A liquid organic compound.

Preferably, the composition comprises in the range from 20 to 1,000 parts of a polymerizable component based on 100 parts of said semiconducting light emitting nanoparticles.

More preferably, the composition comprises in the range from 20 to 1,000 wt. % of a polymerizable component based on the total amount of said semiconducting light emitting nanoparticles.

The composition can be of any kind known to a skilled person. The composition can be a suspension, so it may comprise liquid and solid constituents. An example of a liquid constituent is the liquid organic compound. The quantum material is an example of a solid constituent. Each one of the further constituents of the composition can be of solid or liquid state at room temperature (20° C.). Each one of the further constituents solid at room temperature can be present as a solid in the composition, or at least partially dissolve or form a gel through the liquid constituents of the composition.

Said semiconducting light emitting nanoparticle can be any kinds of publicly known semiconducting light emitting nanoparticle. For examples, publicly known nanosized inorganic phosphor materials and quantum materials. The quantum material as a constituent of the composition can be any kind of quantum materials known to and considered potentially useful by the skilled person. A quantum material in the context of the present invention can be of any shape known shape for a quantum material, yet is preferably selected from a rod, a dot, a platelet, a flower and a wire. Further, the quantum material can comprise a combination of two or more of the aforementioned shapes.

The semiconducting light emitting nanoparticle may comprise one or more organic ligands. The quantum material can emit light. Yet more preferred, a quantum material comprises one or more semiconducting light emitting particles, or semiconducting light emitting nanoparticles. The semiconducting light emitting nanoparticle usually further comprises one or more organic ligands. The quantum material can emit tunable, sharp and light in the VIS and IR range. VIS refers to light of a wavelength from 400 to 700 nm; IR refers to light of a wavelength above 700 nm up to about 1 mm.

The term "semiconducting" describes in the present context a material whose electronic structure comprises a conduction band, a valence band, and a band gap between the two. The band gap of a semiconducting material is usually larger than zero and less than 4 eV at a temperature of 300 K.

So, a "semiconducting" material has electrical conductivity to a degree between that of a conductor (such as copper) and that of an insulator (such as glass) at room temperature. Preferably, a semiconducting material has an electrical conductivity increases with the temperature.

The term "nanoparticles" means particles which have a size in between 0.1 nm and 999 nm, preferably 0.5 nm to 150 nm, more preferably 1 nm to 50 nm. The term "size" in the present context means the average diameter of the longest axis which can be established through the particles referred to. The size of these nanoparticles refers to the dimension of the inorganic, semiconducting nanoparticle, not considering the dimensions of possibly present ligands on the surface of the inorganic semiconducting nanoparticle, or other surface modification applied thereto. The average diameter of a certain particle is calculated based on statistics measured by Transmission Electron Microscope (TEM).

The term "light emitting" refers to the property of a material or object to emit light at least of a wavelength from 350 nm to 1000 nm upon an external optical excitation such as an incident beam of light of a specific wavelength or a specific wavelength range.

The term "semiconducting light emitting nanoparticle" in the present context refers to a light emitting material which is in accordance with the definition of "semiconducting" and has a nanoparticle size is in between 0.1 nm and 999 nm, preferably 1 nm to 150 nm, more preferably 1 nm to 50 nm.

In an embodiment, the quantum material is selected from the group consisting of II-VI, III-V, and IV-VI semiconductors, and a combination of two or more thereof.

In another embodiment, the quantum material comprises at least one sort of semiconducting nanoparticles which are selected from the group consisting of Cds, CdSe, CdTe, ZnS, ZnSe, ZnTe, ZnO, GaAs, GaP, GaAs, GaSb, HgS, HgSe, HgSe, HgTe, InAs, InP, InPZn, InPZnS, InSb, AlAs, AlP, AlSb, $Cu_2S$, $Cu_2Se$, CuInS2, $CuInSe_2$, $Cu_2(ZnSn)S_4$, $Cu_2(InGa)S_4$, $TiO_2$, InGaP, ZnSeS, alloys, and a combination of two or more thereof.

For example, for red emission use CdSe/CdS, CdSeS/CdZnS, CdSeS/CdS/ZnS, ZnSe/CdS, CdSe/ZnS, InP/ZnS, InP/ZnSe, InP/ZnSe/ZnS, InPZn/ZnS, InPZn/ZnSe/ZnS dots or rods, ZnSe/CdS, ZnSe/ZnS and a combination of two or more thereof.

For example, for green emission use CdSe/CdS, CdSeS/CdZnS, CdSeS/CdS/ZnS, ZnSe/CdS, CdSe/ZnS, InP/ZnS, InP/ZnSe, InP/ZnSe/ZnS, InPZn/ZnS, InPZn/ZnSe/ZnS, ZnSe/CdS, ZnSe/ZnS and a combination of two or more thereof.

For example, for blue emission use, e.g., ZnSe, ZnS, ZnSe/ZnS, and a combination of two or more thereof.

As a quantum material, publicly available quantum material, for examples, CdSeS/ZnS alloyed quantum materials product number 753793, 753777, 753785, 753807, 753750, 753742, 753769, 753866, InP/ZnS quantum materials product number 776769, 776750, 776793, 776777, 776785, PbS core-type quantum materials product number 747017, 747025, 747076, 747084, or CdSe/ZnS alloyed quantum materials product number 754226, 748021, 694592, 694657, 694649, 694630, 694622 from Sigma-Aldrich, can be used preferably as desired.

In some embodiments, the semiconductor nanoparticle can be selected from an anisotropic shaped structure, for example quantum rod material to realize better out-coupling effect (for example *ACS Nano,* 2016, 10 (6), pp 5769-5781).

Examples of quantum rod material have been described in, for example, the international patent application laid-open No.WO2010/095140A.

In a further embodiment, the length of the overall structures of the quantum material, such as a quantum rod material/or the quantum material, is from 1 nm to 500 nm, preferably, from 1 nm to 160 nm, or from 1 nm to 20 nm, or from 5 nm to 15 nm.

The surface of a semiconducting nanoparticle can be overcoated with one or more sorts of surface ligands. Without wishing to be bound by theory it is believed that such a surface ligand may lead to disperse the nanosized fluorescent material in a solvent more easily.

Examples of suited surface ligands in common use include phosphines and phosphine oxides such as Trioctylphosphine oxide (TOPO), Trioctylphosphine (TOP), and Tributylphosphine (TBP); phosphonic acids such as Dodecylphosphonic acid (DDPA), Tridecylphosphonic acid (TDPA), amines such as Oleylamine, Dedecyl amine (DDA), Tetradecyl amine (TDA), Hexadecyl amine (HDA), and Octadecyl amine (ODA), Oleylamine (OLA), 1-Octadecene (ODE), thiols such as hexadecane thiol and hexane thiol; mercapto carboxylic acids such as mercapto propionic acid and mercaptoundecanoicacid; carboxylic acids such as oleic acid, stearic acid, myristic acid; acetic acid and a combination of any of these. Furthermore, the ligands can include Zn-oleate, Zn-acetate, Zn-myristate, Zn-Stearate, Zn-laurate and other Zn-carboxylates. Moreover, polyethylenimine (PEI) can be used by preference.

In a preferred embodiment, the composition comprises at least one liquid organic compound. The composition often comprises in the range from 2,000 to 50,000 parts, for example 5,000 to 25,000 parts, or from 6,000 to 10,000 parts of at least one liquid organic compound based on 100 parts of the semiconducting light emitting nanoparticles in the composition. In an embodiment, the liquid organic compound in the composition comprises at least one organic solvent.

More preferably, the composition comprises at least one liquid organic compound. The composition often comprises in the range from 2,000 to 50,000 wt. %, for example 5,000 to 25,000 wt. %, or from 6,000 to 10,000 wt. % of at least one liquid organic compound based on the total amount of the semiconducting light emitting nanoparticle in the composition.

The solvent can be selected from the group consisting of ethylene glycol monoalkyl ethers, such as, ethylene glycol monomethyl ether, ethylene glycol monoethyl ether, ethylene glycol monopropyl ether, and ethylene glycol monobutyl ether; diethylene glycol dialkyl ethers, such as, diethylene glycol dimethyl ether, diethylene glycol diethyl ether, diethylene glycol dipropyl ether, and diethylene glycol dibutyl ether; ethylene glycol alkyl ether acetates, such as, methyl cellosolve acetate and ethyl cellosolve acetate; propylene glycol alkyl ether acetates, such as, propylene glycol monomethyl ether acetate (PGMEA), propylene glycol monoethyl ether acetate, and propylene glycol monopropyl ether acetate; aromatic hydrocarbons, such as, benzene, toluene and xylene; ketones, such as, methyl ethyl ketone, acetone, methyl amyl ketone, methyl isobutyl ketone, and cyclohexanone; alcohols, such as, ethanol, propanol, butanol, hexanol, cyclohexanol, ethylene glycol, and glycerin; esters, such as, ethyl 3-ethoxypropionate, methyl 3-methoxypropionate and ethyl lactate; and cyclic asters, such as, γ-butyrolactone. Preferred solvents of the above group are propylene glycol alkyl ether acetates, such as, propylene glycol monomethyl ether acetate (hereafter "PGMEA"), propylene glycol monoethyl ether acetate, or propylene glycol monopropyl ether acetate can be used.

In a further embodiment, the liquid organic compound comprises a combination of two or more of the above organic solvents. This includes two or more solvents of one of the groups, or two or more solvents from different of the above groups.

The composition comprises at least one antioxidant. The at least one antioxidant is selected from the group consisting of:

A) a hydroxyphenolic compound comprising a hydroxyphenolic fragment and at least one hydroxy group, wherein the hydroxyphenolic fragment has at least one tert-alkyl group in alpha-position to the at least one hydroxy group, for example 2-tert-Butylhydrochinone; 4-tert-Butylcatechol; 6-tert-Butyl-2,4-xylenol; 3,5-Di-tert-butyl-4-hydroxytoluene; 2,6-Di-tert-butylphenol; or a combination of two or more thereof;

B) a hydroxyphenolic compound which has two hydroxy groups, for example hydroquinone;

C) 2,2-diphenyl-1-picrylhydrazyl;

D) an alkoxy phenol, for example 3,5-di-t-butyl-4-hydroxyanisole;

E) a heterocyclic thiazine, for example 10-methylphenothiazine;

F) a polyphenol, for example carnosol;

G) a hindered amine stabilizer, such as 2,2,6,6-tetramethyl piperidine, 1,2,2,6,6-pentamethyl piperidine; or a combination of the two.

In an embodiment, the composition may comprise a combination of two or more antioxidants of the groups A) through G), for example, a combination of two or more antioxidants of one of the groups A)-G), or a combination of two or more antioxidants selected from different groups A) through G). In a further embodiment, the composition comprises one or more antioxidants, wherein one of the antioxidants is 3,5-di-tert-butyl-4-hydroxytoluene (CAS: 128-37-0).

In a preferred embodiment of the present invention, said antioxidant is a hydroxyphenolic compound comprising a hydroxyphenolic fragment and at least one hydroxy group, wherein the hydroxyphenolic fragment has at least one tert-alkyl group in alpha-position to the at least one hydroxy group, for example 2-tert-Butylhydrochinone; 4-tert-Butylcatechol; 6-tert-Butyl-2,4-xylenol; 3,5-Di-tert-butyl-4-hydroxytoluene; 2,6-Di-tert-butylphenol; or a combination of two or more thereof, even more preferably it is 3,5-di-tert-butyl-4-hydroxytoluene.

The polymerizable compound can be any such compound known to a skilled person and considered to be possibly useful in a composition comprising a semiconducting light emitting nanoparticle.

In an embodiment, the polymerizable component may be selected from the group consisting of UV curable monomers and thermal-curable monomers. Examples of UV curable monomers are, but not limited to, acrylic monomers, methacrylic monomers, alkenes, alkynes and thiols. Examples of thermally curable monomers are, but not limited to, epoxyamines and thiol-enes.

In another embodiment, the amount of the at least one antioxidant is in the range from 20 to 1,000 parts, for example in the range from 50 to 500 parts, or from 100 to 200 parts based on the 100 parts of the semiconducting light emitting nanoparticles.

In a preferred embodiment of the present invention, the amount of the at least one antioxidant is in the range from 20 to 1,000 wt. % based on the total amount of the inorganic part of the semiconducting light emitting nanoparticles in the composition, for example in the range from 50 to 500 wt. %, or from 100 to 200 wt. % based on the total amount of the inorganic part of the semiconducting light emitting nanoparticles in the composition.

For sake of clarity, according to the present invention, the term "inorganic part of the semiconducting light emitting nanoparticle" means all inorganic contents of the semiconducting light emitting nanoparticle. And it does not include any organic ligands attached onto the semiconducting light emitting nanoparticle.

In another embodiment, the composition further comprises an organic additive, which is composed of a divalent metal ion and at least one functionalized hydrocarbon group. The organic additive can be any which is known to the skilled person and appears to be suited in the present invention. A metal ion in the present context is a metal cation. Preferably, the organic additive is not a polymer/macromolecular.

The organic additive can define by formula (Ia) or (Ib)

  (Ia);

  (Ib)

wherein
M is a divalent metal ion,
X is a hydrocarbon chain, and
Y is a functional group.

In a further preferred embodiment, the organic additive can be defined by formula (Ia) or (Ib) and, at least one of the following applies:

a) M is selected from the group consisting of Zn, Mg and Cd;
b) Y is selected from the group consisting of carboxylate, carbamate, xanthate, phosphonate, phosphate, thiolate.

A further preferred embodiment is a combination of two or more organic additives, where one of these features applies: a combination of a) and b), or a combination of two or more of a) with one b), or a combination of two or more of b) with one a), or a combination of two or more of a) and two or more of b).

In a further preferred embodiment of the invention, the organic additive is defined by formula (II)

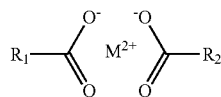  (II)

wherein
M is defined as before;
$R_1$ and $R_2$ can be same or different, linear or branched, and each $R_1$, $R_2$ is selected from the group consisting of an alkyl having a chain of 1 to 16 carbons atoms or an alkenyl group having a chain of 2 to 15 carbon atoms; preferably 1 to 11, or 1 to 6 carbon atoms for alkyl and 2 to 11, or 2 to 6 carbon atoms for alkenyl.

In a further preferred embodiment of the invention, the organic additive comprises an element selected from the group consisting of a Zinc carboxylate, a Cadmium carboxylate and a Magnesium carboxylate, or a combination of two or more elements thereof.

In a further preferred embodiment of the invention, the organic additive comprises a Zinc carboxylate.

In a further embodiment, the quantum material comprises In and P.

In a further embodiment, the quantum yield of the composition after 16 hours from preparation is at least 90%, for example 94% or 96%, with respect to the composition at the time of preparation and under the conditions described herein. The time of preparation equals 0 hours from preparation.

In a further embodiment, the composition usually comprises these constituents in the range at least one semiconducting light emitting nanoparticle such as a quantum material; and from 20 to 1,000 parts of the at least one antioxidant based on the 100 parts of the of the semiconducting light emitting nanoparticles;

optionally from 50 to 400 parts, or from 100 to 200 parts of further constituents, such as e.g. the organic additive composed of a divalent metal ion and at least one functionalized hydrocarbon group;

6,000 to 10,000 parts of at least one liquid organic compound based on the 100 parts of the semiconducting light emitting nanoparticles.

Preferably, said composition comprises these constituents in the range at least one semiconducting light emitting nanoparticle such as a quantum material; and from 20 to 1,000 wt. % of the at least one antioxidant based on the total amount of the inorganic part of the semiconducting light emitting nanoparticles in the composition;

more preferably it is in the range from 50 to 400 wt. %, or from 100 to 200 wt. % of further constituents, such as e.g. the organic additive composed of a divalent metal ion and at least one functionalized hydrocarbon group;

6,000 to 10,000 wt. % of at least one liquid organic compound based on the total amount of the semiconducting light emitting nanoparticles in the composition.

A second aspect is a method of manufacturing the composition as described for the first aspect and its embodiments, comprising at least these steps:

(i) Providing the semiconducting light emitting nanoparticle;
(ii) Providing the at least one antioxidant;
(iii) Providing the liquid organic component;
(iv) Mixing the components of steps (i)-(iii).

Steps (i) to (iv) can be carried out in individual actions or by just combining some or all components in one vessel and forming the composition by stirring the vessel's content.

The steps (i)-(iii) of providing can be performed by any technique or means know in the art and considered applicable by a skilled person. For example, drop-by-drop dosage, injection into a mixing vessel, pouring, and the like.

The composition of the second aspect can be obtained by agitating the constituents of step (i) to (iii). Agitation can be performed individually in each of the aforementioned steps (i) through (iv), or in step (iv) only. In an embodiment, a liquid phase is provided under agitation comprising an organic compound and the semiconducting light emitting nanoparticle, such as a quantum material, in step (i), and agitation is maintained throughout each of the further steps (ii) and (iii). Moreover, intervals of agitation can be implemented between each of steps (i) through (iii). This allows the liquid phase, or a combination of the liquid phase from step (i) with one or more further constituents from step (ii) or (iii) to sit and/or homogenize prior to adding another constituent.

Manufacturing of the composition can be operated under inert conditions, at room temperature as well as elevated temperature, and/or at standard pressure, elevated or reduced pressure, all this referred to the conditions in the mixing vessel. Preferably, step (i) is operated under inert conditions at a temperature in the range from 0 to 100° C. and ambient pressure, which was 1 bar (101.3 kPa), based on the absolute scale (0 kPa=absolute vacuum). Agitation can be achieved by rotating the mixing vessel or by inserting a rotating mixer into a static mixing vessel. A preferred mode of operation includes the use of a flask as static mixing vessel and a stirrer.

In a further embodiment, the composition obtained by the method of the second aspect can be subjected to irradiation with light. It was found that exposing the composition comprising at least a semiconducting light emitting nanoparticle as described above to light can enhance the quantum yield of the composition compared with a composition of quantum material which is not treated this way. In an embodiment, the wavelength of the light is selected in the range of 350-500 nm.

The intensity of light can be same or varying with the wavelength over the spectrum. In another embodiment of the invention, the intensity of the light is in the range from 0.05 to 0.5 W/cm$^2$. In a further embodiment, the composition can be subjected to irradiation with light of a wavelength selected from a range of 300 to 600 nm having an intensity in the range from 0.025 to 1 W/cm$^2$.

A third aspect of the invention is method of manufacturing a layered composite comprising at least these steps:
(a) Providing a substrate;
(b) Providing the composition according to the first aspect or one of its embodiments, or a composition obtainable by a method as described with the second aspect or one of the embodiments related thereto;
(c) Applying the composition to the substrate in order to form a layer; and
(d) Polymerizing the composition.

A layered composite in the present context refers to an item, which comprises at least a substrate and at least one layer. The layered composite can have more than one layer, e.g. 2, 3, 4, 5, 6,7,8,9 or 10 layers. These layers can be all positioned on one side of the substrate. With some substrates, one or more of the layers can be on a surface of the substrate which is averted from the surface onto which the layer of the invention is formed. Moreover, the layered composite can have two or more layers formed from one or more, equal or different compositions, as mentioned above.

Providing a substrate in step (a) can be performed by any means which are known to and considered potentially useful by a skilled person to work the present invention. Preferred ways of providing includes mounting on a substrate holder, placing on a rotating dish, e.g. in a spin-coater or in an inkjet printer.

A suitable substrate can be of any kind known to and considered potentially useful by the skilled person to work the present invention. Preferred examples of a substrate are a piece of glass, a piece of a polymer and a layered structure.

Applying the composition in step (b) can be performed by any means which is known to and considered potentially useful by a skilled person to work the present invention. Preferred ways of applying include spin-coating and dip-coating.

After having applied the composition to the substrate in step (c), wherein a layer was formed, the composition is polymerized in step (d), in order to stabilize the layer on the substrate. The polymerization can be performed by a heat treatment. Any means of heat treatment can be employed which are known to and considered potentially useful by a skilled person to further polymerizations. The heat treatment may affect evaporation of solvent as well as polymerization and/or cross-linking reactions of one or more constituents of the composition. By such heat treatment, a stable layer comprising the aforementioned quantum material is obtained on the substrate.

In another embodiment, polymerizing in step (d) can be performed by a UV treatment. In this event, the layer of the composition on the substrate is exposed to UV irradiation, e.g. irradiation of a wavelength in the range from 400 to 1,000 nm. Often, UV irradiation to polymerize the composition has a wavelength in range from 165 to 365 nm. In a further embodiment, the UV treatment is combined with a heat treatment, e.g. at a temperature in the range from 50 to 200° C. or in the range from 80 to 150° C.

In an embodiment, at least one of the following features applies:
a/The composition is irradiated with light prior to performing step (b).
b/The layer on the substrate is irradiated with light in a step (c);
wherein the light has a wavelength selected from a range of 300 to 600 nm having an intensity in the range from 0.025 to 1 W/cm$^2$ to obtain the composition.

It was found that exposing the composition comprising a quantum material as described above to light could enhance the quantum yield of the composition compared with a composition which is not treat this way. The irradiation with light can be light of any wavelength, spectrum and intensity, considered possibly suitable by a skilled person. In an embodiment of the invention, the wavelength of the light is selected in the range of 350-500 nm. The intensity of light can be same or varying with the wavelength over the spectrum. In another embodiment of the invention, a single wavelength of light can be chosen. In this case more than 90% of the light applied has a wavelength of the mentioned wavelength ±2 nm. In another embodiment of the invention, the intensity of the light is in the range from 0.05 to 0.5 W/cm$^2$. In a further embodiment, the composition can be subjected to irradiation with light of a wavelength selected from a range of 300 to 600 nm having an intensity in the range from 0.025 to 1 W/cm$^2$.

A fourth aspect of the invention is a layered composite obtainable by the method of the third aspect or one of its embodiments. As already mentioned, a preferred layered composite comprises a substrate and at least a layer wherein the at least one layer is a polymer film comprising a quantum material.

In an embodiment, the thickness of the layer is in the range of 0.5 µm to 200 µm, for example from 2 to 100 µm, or from 4 to 50 µm. The thickness of the layer is determined in a direction perpendicular to a plane created by the surface of the substrate which is adjacent to the layer, and the multiple layers respectively. The thickness of the layer can be determined by cutting a sample piece and analyzing the layers along the cut perpendicular through the substrate using Scanning Electron Microscopy (SEM). Two or more layers can be part of the layered composite by further preference.

A fifth aspect of the invention is a layered composite comprising at least:
aa) a layer comprising at least
(A) a semiconducting light emitting nanoparticle,
(B) a matrix polymer and
(C) at least one antioxidant,
preferably the at least one antioxidant is selected from the group consisting of:
A) a hydroxyphenolic compound wherein the hydroxyphenolic fragment has at least one tert-alkyl group in alpha-position to the at least one hydroxy group;
B) a hydroxyphenolic compound which has two hydroxy groups;
C) 2,2-diphenyl-1-picrylhydrazyl;

D) an alkoxy phenol, for example 3,5-di-t-butyl-4-hydroxyanisole;
E) a heterocyclic thiazine, for example 10-methylphenothiazine;
F) a polyphenol, for example carnosol; and
G) a hindered amine stabilizer, such as 2,2,6,6-tetramethyl piperidine, 1,2,2,6,6-pentamethyl piperidine;
or a combination of two or more thereof;
bb) a substrate;
cc) optionally one or more further layers.

Preferred embodiments of the components of the fifth aspect of the invention are the same as described above, and in particular as those described with respect to the first, second, third and fourth aspect. The at least one layer in aa) is preferably obtained from a composition according to the first aspect or one of its embodiments, and/or by one of the methods according to the second and fourth aspect of the invention, and the embodiments thereto. The matrix polymer is formed by the polymerization of the polymerizable compound of the composition of the first aspect.

A sixth aspect of the invention is an optical device comprising a layered composite as described above or as obtainable by aforementioned processes. The layered composite can be an optical sheet, for example, a color filter, a color conversion film, remote phosphor tape, or another film or filter.

The optical device comprising the layered composite can any known to the skilled person. Examples of such optical device are a liquid crystal display device (LCD), an organic light emitting diode (OLED), a backlight unit for an optical display, a light emitting diode device (LED), micro electro mechanical systems (here in after "MEMS"), electro wetting display, an electrophoretic display, a lighting device and a solar cell.

A seventh aspect is a use of an antioxidant selected from the group consisting of:
A) a hydroxyphenolic compound wherein the hydroxyphenolic fragment has at least one tert-alkyl group in alpha-position to the at least one hydroxy group,
B) a hydroxyphenolic compound which has two hydroxy groups;
C) 2,2-diphenyl-1-picrylhydrazyl;
D) an alkoxy phenol;
E) a heterocyclic thiazine;
F) a polyphenol; and
G) a hindered amine stabilizer;
or a combination of two or more thereof;
to improve at least one feature of a quantum material or a quantum material layer, wherein the feature is selected from the group consisting of:
(I) the storage time of a dispersion comprising quantum material;
(II) the quantum yield of a dispersion comprising quantum material;
(III) to enhance the quantum yield of layers comprising quantum material;
(IV) to improve the thermal stability of layers comprising quantum material;
(V) to improve the photo-stability of layers comprising quantum material; or a combination of two or more thereof.

Suited antioxidants and further embodiments of this aspect are those which are described above with regard to the first aspect. This is in particular applicable to the antioxidants of groups A) through G) and preferred combinations of two or more thereof.

According to the present invention, said composition may comprises two or more semiconducting light emitting nanoparticles. Preferably said composition comprises a plurality of said semiconducting light emitting nanoparticles.

Test Methods
Quantum Yield

Measurements of Quantum Yield (QY), Center Wavelength (CWL, also referred to as: peak wavelength) and Full width half max (FWHM, also referred to as: peak band) in solutions were performed on a Hamamatsu Quantaurus QY Absolute PL quantum yield spectrometer C11347-11 (in the following referred to as "Hamamatsu Quantaurus").

EXAMPLES

The following examples illustrate some aspects of the invention. It is understood that the examples and embodiments described herein are for illustrative purposes only and that various modifications or changes in light thereof may be suggested by one skilled in the art without departing from the scope of the present invention. Accordingly, the invention is not limited by or to the examples. Amounts mentioned in the tables below refer to wt.-% if not indicated to the contrary.

Example 1—Synthesis of InP/ZnSe Quantum Material 112 mg of $InI_3$, and 150 mg $ZnCl_2$ are dissolved in 2.5 mL oleylamine. The dispersion is heated to 180° C. Then, 0.22 mL of hexaethylphosphorous triamide (CAS no. 2283-11-6, also referred to as: $DEA_3P$) is added to the solution and kept at 180° C. for 20 min more. Then, 0.55 mL of anion selenium precursor (2M TOP:Se) is added slowly to the dispersion. TOP:SE is prepared from Se (CAS no. 7782-49-2, 99.99%) and trioctyphosphine (CAS: 4731-53-7, 97%). The dispersion is then heated by steps, followed by successive injections of 2.4 mL of 0.4 M Zn(oleate) in 1-octadecene (CAS no. 112-88-9, technical grade—90%) and 0.38 mL of 2M TOP:Se shell precursor at temperatures between 200° C. and 320° C.

Example 2: Measurement of InP/ZnSe Materials in Toluene with and without BHT

All following examples (except comparative example 7 below) start from cleaning of mixed crude material with two cleaning cycles with toluene: ethanol (ratio crude:toluene: ethanol as 1:1:2 v/v) and a $3^{rd}$ cycle with direct precipitation from hexane. By this cleaning procedure, the initial organic content is reduced to 13-20% w/w, according TG analysis.

The vials with dispersions of quantum materials are adjusted to have 1 ml with a concentration of 20 mgr/ml (with respect to the semiconducting nanoparticles, i.e. w/o counting organic content). In samples with Zn-acetate and/or BHT, prior to the procedure, about 30% w/w of Zn-acetate (Zn(Ac)2) and/or around 5% w/w of BHT are added to the dispersion and degassed for 1 hour. Then 1 ml of QDs (=quantum dots) solution in toluene is added and stirred for 1 hour. The Quantum Yield is checked with 0.05 ml of the solution per 4 ml of Toluene in Hamamatsu cuvette. After 0 and 16 hours the quantum yield of the sample is measured using Hamamatsu absolute quantum yield spectrometer (model: Quantaurus C11347-11).

Comparative Examples 1

In these examples, the performance of freshly cleaned samples (substrate +layer of quantum material) is investigated right after cleaning and after 16 hours. The Quantum Yield is 65% and 55%, respectively (see Table 1).

Comparative Examples 2

In these examples, the performance of freshly cleaned samples as in comparative examples 1 is investigated. However, the dispersion of quantum material had an amount of around 5% w/w of BHT. The Quantum Yield is determined right after cleaning and after 16 hours. The Quantum Yield is 65% and 64%, respectively.

TABLE 1

| No. | Samples: Nanoco red quantum dots in toluene | QY (%) |
|---|---|---|
| A | QDs material (as purchased) with original ligands | 57% |
| B | Comparative example 1: After 0 hours | 65% |
| C | Comparative example 1: After 16 hours | 55% |
| D | Comparative example 2: After 0 hours | 65% |
| E | Comparative example 2: After 16 hours | 64% |

Example 3: Measurement of InP/ZnSe Materials in Toluene with and without BHT, and with and without Zinc-Carboxylate (Such as Zinc-Acetate)

The procedure of the following examples is in general the same as for comparative examples no.1. However, change of quantum yield (QY) is studied depending on an
   addition of 4 mg/ml of zinc carboxylate (Zn-acetate) to the dispersion,
   addition of 5 parts BHT to the dispersion (100 parts),
   illumination for 16 hours.
The results are shown in Table 2.

TABLE 2

| No. | Samples: Nanoco red quantum dots in toluene | QY (%) |
|---|---|---|
| F | Comparative example 3: Reference (purified QDs) (after 16 hr) | 55% |
| G | Comparative example 3: Reference (purified QDs) Illuminated for 16 hr | 64% |
| H | Comparative example 4: Reference (purified QDs) + BHT (after 16 hr) | 63% |
| I | Comparative example 4: Reference (purified QDs) + BHT Illuminated for 16 hr | 63% |
| J | Comparative example 5: Purified QDs + Zn-acetate (after 16 hr) | 61% |
| K | Comparative example 5: Purified QDs + Zn-acetate Illuminated for 16 hr | 68% |
| L | Comparative example 6: Purified QDs + Zn-acetate + BHT (after 16 hr) | 65% |
| M | Comparative example 6: Purified QDs + Zn-acetate + BHT Illuminated for 16 hr | 72% |

According to the data in table 2, samples show increased quantum yield if containing antioxidant BHT or being illuminated for 16 hours. Samples comprising 4 mg/ml Zinc acetate show a generally higher quantum yield (QY) than those without.

Example 4: Measurement of Nanoco Red Quantum Dots Materials in PGMEA with and without BHT. No Cleaning and No Illumination Applied Original dispersions of Nanoco red quantum dots in toluene (110 mg Quantum clots/ml) are diluted with anhydrous toluene (Cas no. 108-88-3, 99.8%) to a concentration of 20 mg/ml with total volume of 2 ml.
Then in 2 empty vials are added:
1. 20% w/w of 11-phosphonoundecyl acrylate
2. 20% w/w of 11-phosphonoundecyl acrylate and ~5% w/w of BHT.

Before addition of the Quantum dot dispersions, the vials are degassed for 1 hour. In each vial is added 1 ml of quantum dot solution and stirred for 1 hour. Then, toluene is removed under Argon flow. Then 1 ml of PGMEA is added and stirred for 1 more hour.

The quantum yield of a reference sample in toluene is measured according to procedure mentioned in example 2.

According to the measurements in table 3, the quantum yield loss is greater for those samples that do not contain BHT.

TABLE 3

| No. | Samples: Nanoco red quantum dots in PGMEA | QY (%) |
|---|---|---|
| N | Reference (in toluene) | 81% |
| O | Comparative example 7: QDs + 11-Phosphonoundecyl acrylate in PGMEA | 72% |
| P | Comparative example 7: QDs + 11-Phosphonoundecyl acrylate + BHT in PGMEA | 78% |

Similar experiment with high load (170 mg/ml) of Nanoco red quantum dots in PGMA is conducted also to give 81% of QY. Same QY value is measured after 1-2 month of storage. QY of samples without BHT from same series is not measured.

The invention claimed is:

1. A composition comprising at least these components:
   i) at least one sort of semiconducting nanoparticle;
   ii) at least one antioxidant, which is 2-tert-Butylhydrochinone; 4-tert-Butylcatechol; 6-tert-Butyl-2, 4-xylenol; 3,5-Di-tert-butyl-4-hydroxytoluene; 2,6-Di-tert-butylphenol; or a combination of two or more thereof;
   iii) a polymerizable component; and
   iv) a liquid organic compound; and
   v) an organic additive of formula (II)

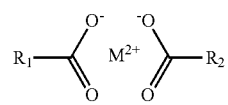

(II)

wherein

M is a divalent metal ion; and $R_1$ and $R_2$ are, each independently, a straight chain alkyl group having 1 to 16 carbons atoms, or a straight chain alkenyl group having 2 to 15 carbon atoms or a branched chain alkyl or alkenyl group having 3 to 15 carbon atoms.

2. The composition of claim 1, wherein the polymerizable component is selected from the group consisting of UV curable monomers and thermal-curable monomers.

3. The composition according to claim 1, wherein the composition comprises 20 to 1,000 parts of the at least one antioxidant based on 100 parts of the semiconducting nanoparticles in the composition.

4. The composition according to claim 1, wherein M is Zn, Mg or Cd.

5. The composition according to claim 1, wherein the at least one sort of semiconducting nanoparticle comprises In and P.

6. The composition according to claim 1, wherein the liquid organic compound is selected from the group consisting of monoalkyl ethers, diethylene glycol dialkyl ethers, alkylene glycol ether acetates, ethylene glycol alkyl ether acetates, propylene glycol alkyl ether acetates, aromatic hydrocarbons, ketones, alcohols esters, ethylene carbonate, and combinations of two or more thereof.

7. The composition according to claim 1, wherein the quantum yield of the composition after 16 hours from said composition having been prepared is at least 90%, with respect to the composition at the time of preparation.

8. The composition according to claim 1, wherein the composition comprises 50 to 400 parts of the polymerizable component based on 100 parts of the semiconducting nanoparticles in the composition.

9. The composition of claim 1, wherein said antioxidants is 2-tert-Butylhydrochinone; 4-tert-Butylcatechol; 6-tert-Butyl-2,4-xylenol; 2,6-Di-tert-butylphenol; or a combination of two or more thereof.

10. A method of manufacturing the composition according to claim 1, comprising at least these steps:
(i) providing the quantum material;
(ii) providing the at least one antioxidant, which is 2-tert-Butylhydrochinone; 4-tert-Butylcatechol; 6-tert-Butyl-2,4-xylenol; 3,5-Di-tert-butyl-4-hydroxytoluene; 2,6-Di-tert-butylphenol; or a combination of two or more thereof;
(iii) providing the liquid organic component;
(iv) providing the polymerizable component;
(v) providing the organic additive of formula (II); and mixing the components of steps (i)-(v).

11. The method of claim 10, wherein the composition is subjected to irradiation with light of a wavelength of 300 to 600 nm having an intensity of a wavelength of 300 to 600 nm having an intensity of 0.025 to 1 W/cm².

12. A method of manufacturing a polymer layer comprising at least these steps:
(a) providing a substrate;
(b) providing the composition of claim 1;
(c) applying the composition to the substrate to form a layer; and
(d) polymerizing the composition.

13. An optical device comprising a layered composite obtained by a method according to claim 12.

14. A layered composite comprising at least:
aa) a layer comprising at least
(A) a quantum material comprising a plurality of at least one kind of semiconducting nanoparticle,
(B) a matrix polymer,
(C) at least one antioxidant, which is 2-tert-Butylhydrochinone; 4-tert-Butylcatechol; 6-tert-Butyl-2,4-xylenol; 3,5-Di-tert-butyl-4-hydroxytoluene; 2,6-Di-tert-butylphenol; or a combination of two or more thereof, and
(D) an organic additive of formula (II)

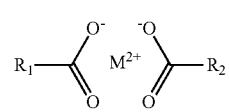

(II)

wherein
M is a divalent metal ion; and
$R_1$ and $R_2$ are, each independently, a straight chain alkyl group having 1 to 16 carbons atoms, or a straight chain alkenyl group having 2 to 15 carbon atoms or a branched chain alkyl or alkenyl group having 3 to 15 carbon atoms and
bb) a substrate.

15. The layered composite according to claim 14, wherein said antioxidant is 3,5-Di-tert-butyl-4-hydroxytoluene.

16. The layered composite according to claim 14, wherein M is Zn, Mg or Cd.

17. An optical device comprising a layered composite according to claim 14.

18. A composition comprising at least these components:
i) at least one sort of semiconducting nanoparticle;
ii) at least one antioxidant, which includes 3,5-di-tert-butyl-4-hydroxytoluene;
iii) a polymerizable component;
iv) a liquid organic compound; and
v) an organic additive of formula (II)

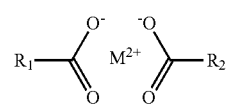

(II)

wherein
M is divalent metal ion; and
$R_1$ and $R_2$ are, each independently, a straight chain alkyl group having 1 to 16 carbons atoms, or a straight chain alkenyl group having 2 to 15 carbon atoms or a branched chain alkyl or alkenyl group having 3 to 15 carbon atoms.

* * * * *